(12) United States Patent
Patel et al.

(10) Patent No.: US 12,122,719 B2
(45) Date of Patent: Oct. 22, 2024

(54) METHODS OF SURFACE MODIFICATION OF METAL CASINGS AND CEMENT SHEATH BONDING

(71) Applicant: Saudi Arabian Oil Company, Dhahran (SA)

(72) Inventors: Hasmukh A. Patel, Katy, TX (US); Arpita Pal Bathija, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 46 days.

(21) Appl. No.: 17/903,470

(22) Filed: Sep. 6, 2022

(65) Prior Publication Data
US 2024/0092694 A1 Mar. 21, 2024

(51) Int. Cl.
| | | |
|---|---|---|
| *C04B 20/10* | (2006.01) | |
| *C04B 28/04* | (2006.01) | |
| *C04B 111/26* | (2006.01) | |
| *C09K 8/467* | (2006.01) | |
| *C09K 8/54* | (2006.01) | |
| *C23C 22/60* | (2006.01) | |
| *C23C 22/82* | (2006.01) | |
| *E21B 33/16* | (2006.01) | |

(52) U.S. Cl.
CPC .......... *C04B 20/1022* (2013.01); *C04B 28/04* (2013.01); *C09K 8/467* (2013.01); *C09K 8/54* (2013.01); *C23C 22/60* (2013.01); *C23C 22/82* (2013.01); *E21B 33/16* (2013.01); *C04B 2111/26* (2013.01); *C04B 2201/50* (2013.01); *C09K 2208/32* (2013.01)

(58) Field of Classification Search
CPC . C04B 20/1022; C04B 28/04; C04B 2111/26; C04B 2201/50; C23C 22/60; C23C 22/82; E21B 33/16; C09K 8/467; C09K 8/54; C09K 2208/32
See application file for complete search history.

(56) References Cited

U.S. PATENT DOCUMENTS 10,836,950 B1 * 11/2020 Patel ................. E21B 33/14
2015/0152124 A1 6/2015 Mori et al.
2020/0339861 A1 10/2020 Patel et al.

FOREIGN PATENT DOCUMENTS

CN 111233362 6/2020
FR 3095652 A1 * 11/2020 ............ C09K 8/54

OTHER PUBLICATIONS

Maagi et al., "Application of nanoparticles for strengthening wellbore cement-formation bonding," Oil & Gas Science and Technology—Rev. IFP Energies, 2020, 75(64), 12 pages.
(Continued)

*Primary Examiner* — Crystal J Lee
(74) *Attorney, Agent, or Firm* — Fish & Richardson P.C.

(57) ABSTRACT

A method of treating the surface of a metal casing used in a wellbore by conditioning the metal casing in a conditioning fluid to form a conditioned metal casing, contacting the conditioned metal casing with a treatment fluid to form a treated metal casing, and drying the treated metal casing. A method of increasing the bond strength between cement and a metal casing surface treated with a reactive organic compound by curing the treated metal casing with a cement slurry.

19 Claims, 2 Drawing Sheets

(56) References Cited

OTHER PUBLICATIONS

Mabeyo et al., "Coupled Effects of Hydrophilic Nano Silica Oxide and Anatase Nano Titanium Oxide on Strengths of Oilwell Cement," Tanzania Journal of Science, 2021, 47(2), 15 pages.

ner.com [online], "AutoLab 3000," New England Research, Inc, available on or before Oct. 15, 2015 via Internet Archive Wayback Machine URL <https://web.archive.org/web/20151015002127/https://www.ner.com/site/systems/autolab-series/autolab-3000.html>, retrieved Dec. 8, 2022, retrieved from URL <https://www.ner.com/site/systems/autolab-series/autolab-3000.html>, 2 pages.

Yang et al., "Experimental study of shear and hydraulic bonding strength between casing and cement under complex temperature and pressure conditions," Royal Society Open Science, 2020, 7:192115, 12 pages.

\* cited by examiner

METHODS OF SURFACE MODIFICATION OF METAL CASINGS AND CEMENT SHEATH BONDING

TECHNICAL FIELD

This document relates to methods for strengthening the bonding between metal casing materials and a surrounding cement sheath by surface treating the metal casing prior to curing with cement. This document also relates to methods of preventing or minimizing debonding between metal casing materials and the surrounding cement.

BACKGROUND

A typical oil and gas well includes casing, a cement sheath, and a rock formation, where the production of oil and gas is carried out through the inner casing. After well completion and during oil production, no openings between the casing and the cement sheath or the cement sheath and the rock formation should exist. Curing the cement sheath provides zonal isolation in order to prevent channeling and acts as a significant sealing component; however, continuous pressure between the casing and the cement sheath can result in fluid leakage due to sealing failure in high temperature and high pressure oil and gas wells. Such a failure can have serious consequences, such as safety to the personnel, environmental hazards, reduction in production, high remedial costs, and loss of the wells.

Several approaches have been used to improve the bonding between casing materials and the cement sheath, including the use of a polymer coating or surface coating with nanomaterials such as silica nanoparticles. However, the long-term stability of these approaches is limited, owing to weak physical or hydrostatic bonding between the modified casing materials and the cement sheath.

Therefore, there is a need for a method for providing long-term cement sheath integrity in order to guarantee the safe and successful production and operation of oil and gas wells.

SUMMARY

Provided in the present disclosure is a method for treating the surface of a metal casing, the method including: conditioning the metal casing in a conditioning fluid containing an aqueous alkali metal hydroxide solution or an organic base, where the conditioning results in the formation of hydroxyl groups on the surface of the metal casing; contacting the conditioned metal casing with a treatment fluid containing cyanuric chloride; and drying the treated metal casing, where the surface of the treated metal casing contains cyanuric chloride covalently bound to the surface hydroxyl groups of the metal casing.

In some embodiments of the method, the conditioning fluid contains de-ionized water, tap water, or sea water.

In some embodiments of the method, the concentration of the alkali metal hydroxide in the conditioning fluid is about 0.1 M to about 5 M. In some embodiments, the alkali metal hydroxide is selected from the group consisting of lithium hydroxide (LiOH), sodium hydroxide (NaOH), potassium hydroxide (KOH), rubidium hydroxide (RbOH), and cesium hydroxide (CsOH).

In some embodiments of the method, the organic base is selected from the group consisting of triethylamine, diisopropylethylamine, pyridine, and mixtures thereof.

In some embodiments of the method, the conditioning includes soaking the metal casing in the conditioning fluid or continuously flowing the conditioning fluid through or out of the casing. In some embodiments, the conditioning includes contacting the metal casing with the conditioning fluid for about 1 hour to about 24 hours; about 2 hours to about 12 hours; or about 2 hours. In some embodiments, the conditioning occurs at about 4° C. to about 45° C.; about 4° C. to about 25° C.; about 4° C. to about 10° C.; or about 4° C.

In some embodiments of the method, the treatment fluid includes an organic solvent. In some embodiments, the organic solvent is selected from the group consisting of tetrahydrofuran (THF), dioxane, and mixtures thereof.

In some embodiments of the method, the treatment fluid contains about 0.1% w/v to about 10% w/v cyanuric chloride; about 0.5% w/v to about 5% w/v cyanuric chloride; about 1% w/v to about 2% w/v cyanuric chloride; or about 1% w/v cyanuric chloride.

In some embodiments of the method, the contacting of the conditioned metal casing with the treatment fluid occurs at about 0° C. to about 30° C.; about 2° C. to about 20° C.; about 4° C. to about 6° C.; or about 4° C. In some embodiments, the contacting the metal casing with the treatment fluid occurs for about 1 hour to about 48 hours; about 2 hours to about 24 hours; about 2 hours; or about 24 hours. In some embodiments, the contacting results in the formation of covalent bonds between the hydroxyl groups on the surface of the metal casing and the cyanuric chloride.

In some embodiments of the method, the conditioning and contacting occurs for a total time of about 1 hour to about 48 hours; about 2 hours to about 24 hours; about 5 hours to about 10 hours.

In some embodiments of the method, the drying occurs at about 15° C. to about 40° C.; about 20° C. to about 30° C.; or about 23° C. to about 26° C.

In some embodiments, the method further includes curing the treated metal casing with a cement slurry. In some embodiments, the cement is a Portland cement selected from the group consisting of Class A cement, Class B cement, Class C cement, Class G cement, Class H cement, and mixtures thereof. In some embodiments, the cement slurry contains cement to water in a ratio of about 4:1, about 3.5:1.5, about 3:2, about 2:1, or about 1:1. In some embodiments, the cement slurry further comprises a retarder, a dispersant, a fluid loss additive, silica flour, defoamer, and combinations thereof.

In some embodiments of the method, the treated metal casing and cement slurry are cured at about 25° C. to about 150° C.; about 80° C. to about 85° C.; or about 82° C. In some embodiments, is the treated metal casing and cement slurry are cured at about 0 MPa to about 100 MPa; about 20 MPa to about 25 MPa; about 20 MPa.

Also provided in the present disclosure is a method for providing zonal isolation in a wellbore in a subterranean formation, the method including: inserting a casing into the wellbore, where the casing has a size such that a wellbore annulus is formed between an outside surface of the casing and a wall of the wellbore, and where the casing has been treated with cyanuric chloride; providing a cement slurry to the wellbore annulus; and allowing the slurry to set, thereby curing and forming a bond between the casing and the cement.

In some embodiments of the method, the cured casing and cement exhibits a compressive bond strength of about 12 MPa to about 80 MPa, about 20 MPa to about 60 MPa, or about 25 MPa to about 30 MPa at a temperature of about 25° C. to about 205° C. and a confining pressure of about 0 MPa to about 100 MPa.

In some embodiments of the method, the cured casing and cement exhibits a shear bond strength of about 5 MPa to about 50 MPa, about 10 MPa to about 25 MPa, or about 15 MPa to about 20 MPa at a temperature of about 25° C. to about 205° C. and a confining pressure of about 0 MPa to about 100 MPa.

DESCRIPTION OF DRAWINGS

FIGS. 2A-2D show cured metal casing-cement samples removed from molds after curing for 3 days at 180° F. (82° C.) and 3000 psi.

DETAILED DESCRIPTION

A typical oil and gas well is made up of casing, a cement sheath, and the rock formation. Formation fluids, for example, oil and gas, are able to flow through the inner casing but not through the interfaces between the casing and cement sheath and the cement sheath and rock formation. Cementing is performed in order to provide such zonal isolation—to restrict the movement of the fluids across different formations. The cement is pumped into the wells to provide structural support for the steel casings and to secure the casings against corrosive fluids. After setting, the cement sheath should possess mechanical properties sufficient to withstand the loads and provide structural sustenance and zonal isolation. Thus, the seal or bond between the cement sheath and the casing is vital in providing zonal isolation to prevent fluid leakage or channeling.

During the lifetime of an oil and gas well, extreme variations in temperature and internal casing pressure generated in the wellbore can lead to sealing failure and fluid leakage due to interfacial debonding between the cement and casing and the cement and rock formation. The strength of the shear bond (the force required to initiate the movement of cement from the rock formation or movement of the steel casing in the cement sheath) between the cement and casing and the cement and rock formation is therefore important in controlling or preventing leakage of fluids, where stronger shear bonds and compressive bonds contribute to increased zonal isolation and prevention of fluid leakage.

Accordingly, provided in the present disclosure are methods for increasing or strengthening shear bond strength and compressive bond strength between the metal casing and the cement sheath of an oil and gas well. Shear bonds are essential to support the pipe mechanically, whereas compressive bonds prevent the formation of micro-annuli. The methods of the present disclosure can be used to strengthen the contact or bond between the cement and the casing and thus result in decreased fluid leakage and increased zonal isolation. Also provided in the present disclosure are methods of providing zonal isolation in a wellbore in a subterranean formation. Also provided are methods of preventing or minimizing interfacial debonding between the casing and the cement sheath.

The methods of the present disclosure involve treating a metal casing prior to its use in a wellbore. In some embodiments, the methods involve treating the metal casing with reactive organic molecules that form strong chemical bonds between the casing materials and the cement sheath. In some embodiments, treatment with the reactive organic molecules results in surface-functionalized casing materials that react and bond more strongly to cement. In some embodiments, the shear bond strength of the surface-functionalized casing materials with cement is increased or strengthened as compared to untreated or neat casing materials. In some embodiments, the compressive bond strength of the surface-functionalized casing materials with cement is increased or strengthened as compared to untreated or neat casing materials.

In some embodiments, the metal casing is treated with a reactive organic molecule. In some embodiments, the metal casing is treated with a reactive organic molecule prior to its use in a wellbore. In some embodiments, the reactive organic molecule is cyanuric chloride. In some embodiments, treatment with cyanuric chloride results in improvement in the shear bond strength with cement as compared to untreated metal casing. In some embodiments, treatment with cyanuric chloride results in improvement in the compressive bond strength with cement as compared to untreated metal casing. Cyanuric chloride ($C_3N_3Cl_3$) has the following structure:

Each chloride group of cyanuric chloride can undergo nucleophilic substitution based on the reaction temperature. The first chloride can be substituted at temperatures lower than about 5° C., the second chloride at temperatures of about 25-30° C., and the third chloride at temperatures higher than about 60° C. In the methods of the present disclosure, cyanuric chloride is used for surface functionalization of metal casing materials. In some embodiments, the metal casing materials are carbon steel or stainless steel. In some embodiments, the surface functionalization provides enhanced bond strength between the metal casing and cement when the treated casing materials are cured with a cement slurry.

Provided in the present disclosure is a method for treating the surface of a metal casing, the method involving conditioning the metal casing in a conditioning fluid, contacting the conditioned metal casing with a treatment fluid containing cyanuric chloride; and drying the treated metal casing. In some embodiments, the surface of the treated metal casing contains cyanuric chloride covalently bound to surface hydroxyl groups of the metal casing. In some embodiments, the method further involves curing the treated metal casing with a cement slurry. Thus, also provided are methods for modifying the surface of a metal casing.

In some embodiments, the methods involve conditioning the metal casing in a conditioning fluid containing an aqueous alkali metal hydroxide solution or an organic base. In some embodiments, the metal is stainless steel. In some embodiments, the metal is carbon steel. In some embodiments, the conditioning fluid contains de-ionized water, tap water, or sea water. In some embodiments, the conditioning fluid contains an aqueous alkali metal hydroxide solution. In some embodiments, the alkali metal hydroxide is selected from the group consisting of lithium hydroxide (LiOH), sodium hydroxide (NaOH), potassium hydroxide (KOH), rubidium hydroxide (RbOH), and cesium hydroxide (CsOH). In some embodiments, the alkali metal hydroxide is selected from the group consisting of NaOH and KOH. In some embodiments, the alkali metal hydroxide is NaOH. In some embodiments, the conditioning fluid contains an organic base. In some embodiments, the organic base is selected from the group consisting of triethylamine, diisopropylethylamine, pyridine, and mixtures thereof. In some embodiments, the conditioning results in the formation of hydroxyl groups on the surface of the metal casing.

In some embodiments, the concentration of the alkali metal hydroxide or organic base in the conditioning fluid is about 0.1 M to about 5 M, such as about 0.1 M to about 4.5 M, about 0.1 M to about 4 M, about 0.1 M to about 3.5 M, about 0.1 M to about 3 M, about 0.1 M to about 2.5 M, about 0.1 M to about 2 M, about 0.1 M to about 1.5 M, about 0.1 M to about 1 M, about 0.1 M to about 0.5 M, about 0.5 M to about 5 M, about 0.5 M to about 4.5 M, about 0.5 M to about 4 M, about 0.5 M to about 3.5 M, about 0.5 M to about 3 M, about 0.5 M to about 2.5 M, about 0.5 M to about 2 M, about 0.5 M to about 1.5 M, about 0.5 M to about 1 M, about 1 M to about 5 M, about 1 M to about 4.5 M, about 1 M to about 4 M, about 1 M to about 3.5 M, about 1 M to about 3 M, about 1 M to about 2.5 M, about 1 M to about 2 M, about 1 M to about 1.5 M, about 1.5 M to about 5 M, about 1.5 M to about 4.5 M, about 1.5 M to about 4 M, about 1.5 M to about 3.5 M, about 1.5 M to about 3 M, about 1.5 M to about 2.5 M, about 1.5 M to about 2 M, about 2 M to about 5 M, about 2 M to about 4.5 M, about 2 M to about 4 M, about 2 M to about 3.5 M, about 2 M to about 3 M, about 2 M to about 2.5 M, about 2.5 M to about 5 M, about 2.5 M to about 4.5 M, about 2.5 M to about 4 M, about 2.5 M to about 3.5 M, about 2.5 M to about 3 M, about 3 M to about 5 M, about 3 M to about 4.5 M, about 3 M to about 4 M, about 3 M to about 3.5 M, about 3.5 M to about 5 M, about 3.5 M to about 4.5 M, about 3.5 M to about 4 M, about 4 M to about 5 M, about 4 M to about 4.5 M, about 4.5 M to about 5 M, or about 0.1 M, about 0.2 M, about 0.3 M, about 0.4 M, about 0.5 M, about 0.6 M, about 0.7 M, about 0.8 M, about 0.9 M, about 1 M, about 1.5 M, about 2 M, about 2.5 M, about 3 M, about 3.5 M, about 4 M, about 4.5 M, or about 5 M. In some embodiments, the concentration of the alkali metal hydroxide or organic base in the conditioning fluid is about 0.1 M to about 2 M. In some embodiments, the concentration of the alkali metal hydroxide or organic base in the conditioning fluid is about 1 M.

In some embodiments of the method, the contacting the metal casing with the conditioning fluid includes soaking the metal casing in the conditioning fluid. In some embodiments, the contacting the metal casing with the conditioning fluid includes continuously flowing the conditioning fluid through or out of the casing.

In some embodiments of the method, the conditioning includes contacting the metal casing with the conditioning fluid for about 1 hour to about 24 hours, such as about 1 hour to about 18 hours, about 1 hour to about 12 hours, about 1 hour to about 6 hours, about 1 hour to about 2 hours, about 2 hours to about 24 hours, about 2 hours to about 18 hours, about 2 hours to about 12 hours, about 2 hours to about 6 hours, about 6 hours to about 24 hours, about 6 hours to about 18 hours, about 6 hours to about 12 hours, about 12 hours to about 24 hours, about 12 hours to about 18 hours, about 18 hours to about 24 hours, or about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours or about 24 hours. In some embodiments, the conditioning includes contacting the metal casing with the conditioning fluid for about 2 hours to about 12 hours. In some embodiments, the conditioning includes contacting the metal casing with the conditioning fluid for about 2 hours.

In some embodiments of the method, the conditioning includes contacting the metal casing with the conditioning fluid at about 4° C. to about 45° C., such as about 4° C. to about 40° C., about 4° C. to about 35° C., about 4° C. to about 30° C., about 4° C. to about 25° C., about 4° C. to about 20° C., about 4° C. to about 15° C., about 4° C. to about 10° C., about 10° C. to about 45° C., about 10° C. to about 40° C., about 10° C. to about 35° C., about 10° C. to about 30° C., about 10° C. to about 25° C., about 10° C. to about 20° C., about 10° C. to about 15° C., about 15° C. to about 45° C., about 15° C. to about 40° C., about 15° C. to about 35° C., about 15° C. to about 30° C., about 15° C. to about 25° C., about 15° C. to about 20° C., about 20° C. to about 45° C., about 20° C. to about 40° C., about 20° C. to about 35° C., about 20° C. to about 30° C., about 20° C. to about 25° C., about 25° C. to about 45° C., about 25° C. to about 40° C., about 25° C. to about 35° C., about 25° C. to about 30° C., about 30° C. to about 45° C., about 30° C. to about 40° C., about 30° C. to about 35° C., about 35° C. to about 45° C., about 35° C. to about 40° C., about 40° C. to about 45° C., or about 4° C., about 5° C., about 6° C., about 7° C., about 8° C., about 9° C., about 10° C., about 15° C., about 20° C., about 25° C., about 30° C., about 35° C., about 40° C., or about 45° C. In some embodiments of the method, the conditioning includes contacting the metal casing with the conditioning fluid at about 4° C. to about 25° C. In some embodiments of the method, the conditioning includes contacting the metal casing with the conditioning fluid at about 4° C. to about 10° C. In some embodiments of the method, the conditioning includes contacting the metal casing with the conditioning fluid at about 4° C.

In some embodiments of the method, the conditioning includes contacting the metal casing with the conditioning fluid for about 1 hour to about 24 hours at about 4° C. to about 25° C. In some embodiments, the conditioning includes contacting the metal casing with the conditioning fluid for about 2 hours to about 12 hours at about 4° C. to about 10° C. In some embodiments, the conditioning includes contacting the metal casing with the conditioning fluid for about 2 hours at about 4° C.

In some embodiments, the method involves contacting the conditioned metal casing with a treatment fluid comprising cyanuric chloride. In some embodiments, the contacting results in the formation of covalent bonds between the hydroxyl groups on the surface of the metal casing and the cyanuric chloride. In some embodiments, the treatment fluid comprises about 0.1% w/v to about 10% w/v cyanuric chloride, such as about 0.5% w/v to about 9% w/v, about 0.5% w/v to about 8% w/v, about 0.5% w/v to about 7% w/v, about 0.5% w/v to about 6% w/v, about 0.5% w/v to about 5% w/v, about 0.5% w/v to about 4% w/v, about 0.5% w/v to about 3% w/v, about 0.5% w/v to about 2% w/v, about 0.5% w/v to about 1.5% w/v, about 0.5% w/v to about 1% w/v, about 1% w/v to about 10% w/v, about 1% w/v to about 9% w/v, about 1% w/v to about 8% w/v, about 1% w/v to about 7% w/v, about 1% w/v to about 6% w/v, about 1% w/v to about 5% w/v, about 1% w/v to about 4% w/v, about 1% w/v to about 3% w/v, about 1% w/v to about 2% w/v, about 1.5% w/v to about 10% w/v, about 1.5% w/v to about 9% w/v, about 1.5% w/v to about 8% w/v, about 1.5% w/v to about 7% w/v, about 1.5% w/v to about 6% w/v, about 1.5% w/v to about 5% w/v, about 1.5% w/v to about 4% w/v, about 1.5% w/v to about 3% w/v, about 1.5% w/v to about 2% w/v, about 2% w/v to about 10% w/v, about 2% w/v to about 9% w/v, about 2% w/v to about 8% w/v, about 2% w/v to about 7% w/v, about 2% w/v to about 6% w/v, about 2% w/v to about 5% w/v, about 2% w/v to about 4% w/v, about 2% w/v to about 3% w/v, about 3% w/v to about 10% w/v, about 3% w/v to about 9% w/v, about 3% w/v to about 8% w/v, about 3% w/v to about 7% w/v, about 3% w/v to about 6% w/v, about 3% w/v to about 5% w/v, about 3% w/v to about 4% w/v, about 4% w/v to about 10% w/v, about 4% w/v to about 9% w/v, about 4% w/v to about 8% w/v, about 4% w/v to about 7% w/v, about 4% w/v to about 6% w/v, about 4% w/v to about 5% w/v, about 5% w/v to about 10% w/v, about 5% w/v to about 9% w/v, about 5% w/v to about 8% w/v, about 5% w/v to about 7% w/v, about 5% w/v to about 6% w/v, about 6% w/v to about 10% w/v, about 6% w/v to about 9% w/v, about 6% w/v to about 8% w/v, about 6% w/v to about 7% w/v, about 7% w/v to about 10% w/v, about 7% w/v to about 9% w/v, about 7% w/v to about 8% w/v, about 8% w/v to about 10% w/v, about 8% w/v to about 9% w/v, about 9% w/v to about 10% w/v, or about 0.1% w/v, about 0.5% w/v, about 1% w/v, about 1.5% w/v, about 2% w/v, about 2.5% w/v, about 3% w/v, about 3.5% w/v, about 4% w/v, about 4.5% w/v, about 5% w/v, about 5.5% w/v, about 6% w/v, about 6.5% w/v, about 7% w/v, about 7.5% w/v, about 8% w/v, about 8.5% w/v, about 9% w/v, about 9.5% w/v, or about 10% w/v. In some embodiments, the treatment fluid comprises about 0.5% w/v to about 5% w/v cyanuric chloride. In some embodiments, the treatment fluid comprises about 1% w/v to about 2% w/v cyanuric chloride. In some embodiments, the treatment fluid comprises about 1% w/v cyanuric chloride.

In some embodiments of the method, the treatment fluid comprises an organic solvent. In some embodiments, the organic solvent is a hydrocarbon solvent, an aromatic hydrocarbon solvent, a heteroaromatic solvent, or mixtures thereof. Examples of suitable organic solvents include, but are not limited to, benzene, toluene, hexane, tetrahydrofuran, dioxane, and mixtures thereof. In some embodiments, the organic solvent is selected from the group consisting of tetrahydrofuran (THF), dioxane, and mixtures thereof. In some embodiments, the solvent is THF. In some embodiments, the solvent is dioxane. In some embodiments, the solvent is a mixture of THF and dioxane.

In some embodiments of the method, the contacting of the conditioned metal casing with the treatment fluid occurs for about 1 hour to about 48 hours, such as about 1 hour to about 36 hours, about 1 hour to about 24 hours, such as about 1 hour to about 18 hours, about 1 hour to about 12 hours, about 1 hour to about 6 hours, about 1 hour to about 2 hours, about 2 hours to about 48 hours, about 2 hours to about 36 hours, about 2 hours to about 24 hours, about 2 hours to about 18 hours, about 2 hours to about 12 hours, about 2 hours to about 6 hours, about 6 hours to about 48 hours, about 6 hours to about 36 hours, about 6 hours to about 24 hours, about 6 hours to about 18 hours, about 6 hours to about 12 hours, about 12 hours to about 48 hours, about 12 hours to about 36 hours, about 12 hours to about 24 hours, about 12 hours to about 18 hours, about 18 hours to about 48 hours, about 18 hours to about 36 hours, about 18 hours to about 24 hours, about 24 hours to about 48 hours, about 24 hours to about 36 hours, about 36 hours to about 48 hours, or about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 24 hours, about 30 hours, about 36 hours, about 42 hours, or about 48 hours. In some embodiments, the contacting of the conditioned metal casing with the treatment fluid occurs for about 1 hour to about 48 hours. In some embodiments, the contacting of the conditioned metal casing with the treatment fluid occurs for about 2 hours to about 24 hours. In some embodiments, the contacting of the conditioned metal casing with the treatment fluid occurs for about 2 hours. In some embodiments, the contacting of the conditioned metal casing with the treatment fluid occurs for about 24 hours.

In some embodiments of the method, the contacting of the conditioned metal casing with the treatment fluid occurs at about 0° C. to about 30° C., such as about 0° C. to about 25° C., about 0° C. to about 20° C., about 0° C. to about 15° C., about 0° C. to about 10° C., about 0° C. to about 6° C., about 0° C. to about 4° C., about 0° C. to about 2° C., about 2° C. to about 30° C., about 2° C. to about 25° C., about 2° C. to about 20° C., about 2° C. to about 15° C., about 2° C. to about 10° C., about 2° C. to about 6° C., about 2° C. to about 4° C., about 4° C. to about 30° C., about 4° C. to about 25° C., about 4° C. to about 20° C., about 4° C. to about 15° C., about 4° C. to about 10° C., about 4° C. to about 6° C., about 6° C. to about 30° C., about 6° C. to about 25° C., about 6° C. to about 20° C., about 6° C. to about 15° C., about 6° C. to about 10° C., about 10° C. to about 30° C., about 10° C. to about 25° C., about 10° C. to about 20° C., about 10° C. to about 15° C., about 15° C. to about 30° C., about 15° C. to about 25° C., about 15° C. to about 20° C., about 20° C. to about 25° C., about 25° C. to about 30° C., about 20° C. to about 25° C., about 25° C. to about 30° C., or about 0° C., about 1° C., about 2° C., about 3° C., or about 4° C., about 5° C., about 6° C., about 7° C., about 8° C., about 9° C., about 10° C., about 15° C., about 20° C., about 25° C., or about 30° C. In some embodiments of the method, the contacting of the conditioned metal casing with the treatment fluid occurs at about 0° C. to about 30° C. In some embodiments of the method, the contacting of the conditioned metal casing with the treatment fluid occurs at about 2° C. to about 20° C. In some embodiments of the method, the contacting of the conditioned metal casing with the treatment fluid occurs at about 4° C. to about 6° C. In some embodiments of the method, the contacting of the conditioned metal casing with the treatment fluid occurs at about 4° C.

In some embodiments of the method, the contacting of the conditioned metal casing with the treatment fluid occurs for about 1 hour to about 48 hours at about 0° C. to about 30° C. In some embodiments, the contacting of the conditioned metal casing with the treatment fluid occurs for about 2 hours to about 24 hours at about 2° C. to about 20° C. In some embodiments, the contacting of the conditioned metal casing with the treatment fluid occurs for about 2 hours at about 4° C. In some embodiments, the contacting of the conditioned metal casing with the treatment fluid occurs for about 24 hours at about 4° C.

In some embodiments of the method, the total time for the conditioning and the contacting of the conditioned metal casing with the treatment fluid is about 1 hour to about 48 hours, about 2 hours to about 24 hours, or about 5 hours to about 10 hours.

In some embodiments, the method involves drying the treated metal casing. In some embodiments, the treated metal casing is dried at about 15° C. to about 40° C., such as about 15° C. to about 35° C., about 15° C. to about 30° C., about 15° C. to about 25° C., about 15° C. to about 20° C., about 20° C. to about 40° C., about 20° C. to about 35° C., about 20° C. to about 30° C., about 20° C. to about 25° C., about 25° C. to about 40° C., such as 25° C. to about 35° C., about 25° C. to about 30° C., about 30° C. to about 40° C., such as 30° C. to about 35° C., about 35° C. to about 40° C., or about 15° C., about 20° C., about 25° C., about 30° C., about 35° C., or about 40° C. In some embodiments, the treated metal casing is dried at about 15° C. to about 40° C. In some embodiments, the treated metal casing is dried at about 20° C. to about 30° C. In some embodiments, the treated metal casing is dried at about 23° C. to about 26° C.

In some embodiments, the method provides a treated metal casing in which the surface of the treated metal casing contains cyanuric chloride covalently bound to the surface hydroxyl groups of the metal casing.

The methods of the present disclosure also include curing the treated metal casing prepared as described in the present disclosure with a cement slurry. In some embodiments, the cement is an American Petroleum Institute (API) cement. In some embodiments, the cement is a Portland cement. In some embodiments, the cement is selected from the group consisting of Class A cement, Class B cement, Class C cement, Class G cement, Class H cement, and mixtures thereof.

In some embodiments, the cement slurry contains water. In some embodiments, the cement slurry contains cement to water in a ratio of about 4:1, such as about 3.5:1.5, about 3:2, about 2:1, or about 1:1.

In some embodiments, the cement slurry contains one or more additional components, including, but not limited to a retarder, a dispersant, a fluid loss additive, silica flour, defoamer, and combinations thereof. Examples of suitable retarders include, but are not limited to, those sold by Fritz Industries (Mesquite, TX). In some embodiments, the retarder is a lignosulfonate or chemically-modified lignosulfonate. In some embodiments, the retarder is the chemically-modified lignosulfonate retarder FR-1, such as sold by Fritz Industries. Examples of suitable dispersants include, but are not limited to, those sold by Fritz Industries (Mesquite, TX). In some embodiments, the dispersant is a sulfonated polymer. In some embodiments, the dispersant is the sulfonated polymer SC-9, such as sold by Fritz Industries. Examples of suitable fluid loss additives include, but are not limited to, those sold by Fritz Industries (Mesquite, TX). In some embodiments, the fluid loss additive is a polymer-based additive. In some embodiments, the fluid loss additive is the additive FL-24, such as sold by Fritz Industries. An example of a suitable silica flour includes, but is not limited to, a silicon oxide. In some embodiments, the silica flour is a silicon oxide that is 200 mesh size, 74 microns.

In some embodiments, the cement slurry contains a retarder. In some embodiments, the cement slurry contains about 0.1% bowc (based on weight of cement) to about 5% bowc retarder, such as about 0.1% to about 4%, about 0.1% to about 3%, about 0.1% to about 2%, about 0.1% to about 1%, about 0.1% to about 0.5%, about 0.1% to about 0.3%, about 0.1% to about 0.2%, about 0.2% to about 5%, about 0.2% to about 4%, about 0.2% to about 3%, about 0.2% to about 2%, about 0.2% to about 1%, about 0.2% to about 0.5%, about 0.2% to about 0.3%, about 0.3% to about 5%, about 0.3% to about 4%, about 0.3% to about 3%, about 0.3% to about 2%, about 0.3% to about 1%, about 0.3% to about 0.5%, about 0.5% to about 5%, about 0.5% to about 4%, about 0.5% to about 3%, about 0.5% to about 2%, about 0.5% to about 1%, about 1% to about 5%, about 1% to about 4%, about 1% to about 3%, about 1% to about 2%, about 2% to about 5%, about 2% to about 4%, about 2% to about 3%, about 3% to about 5%, about 3% to about 4%, about 4% to about 5%, or about 0.1%, about 0.2%, about 0.3%, about 0.4%, about 0.5%, about 1%, about 1.5%, about 2%, about 2.5%, about 3%, about 3.5%, about 4%, about 4.5%, or about 5% retarder bowc.

In some embodiments, the cement slurry contains about 0.2% to about 0.3% retarder bowc. In some embodiments, the cement slurry contains a dispersant. In some embodiments, the cement slurry contains about 0.05% bowc (based on weight of cement) to about 5% bowc dispersant, such as about 0.1% to about 4%, about 0.1% to about 3%, about 0.1% to about 2%, about 0.1% to about 1%, about 0.1% to about 0.5%, about 0.1% to about 0.3%, about 0.1% to about 0.2%, about 0.2% to about 5%, about 0.2% to about 4%, about 0.2% to about 3%, about 0.2% to about 2%, about 0.2% to about 1%, about 0.2% to about 0.5%, about 0.2% to about 0.3%, about 0.3% to about 5%, about 0.3% to about 4%, about 0.3% to about 3%, about 0.3% to about 2%, about 0.3% to about 1%, about 0.3% to about 0.5%, about 0.5% to about 5%, about 0.5% to about 4%, about 0.5% to about 3%, about 0.5% to about 2%, about 0.5% to about 1%, about 1% to about 5%, about 1% to about 4%, about 1% to about 3%, about 1% to about 2%, about 2% to about 5%, about 2% to about 4%, about 2% to about 3%, about 3% to about 5%, about 3% to about 4%, about 4% to about 5%, or about 0.1%, about 0.2%, about 0.3%, about 0.4%, about 0.5%, about 1%, about 1.5%, about 2%, about 2.5%, about 3%, about 3.5%, about 4%, about 4.5%, or about 5% dispersant bowc. In some embodiments, the cement slurry contains about 0.4% dispersant bowc.

In some embodiments, the cement slurry contains a fluid loss additive. In some embodiments, the cement slurry contains about 0.5% bowc (based on weight of cement) to about 7% bowc fluid loss additive, such as about 0.5% to about 6%, about 0.5% to about 5%, about 0.5% to about 4%, about 0.5% to about 3%, about 0.5% to about 2%, about 0.5% to about 1%, about 0.5% to about 0.7%, about 0.7% to about 7%, about 0.7% to about 6%, about 0.7% to about 5%, about 0.7% to about 4%, about 0.7% to about 3%, about 0.7% to about 2%, about 0.7% to about 1%, about 1% to about 7%, about 1% to about 6%, about 1% to about 5%, about 1% to about 4%, about 1% to about 3%, about 1% to about 2%, about 2% to about 7%, about 2% to about 6%, about 2% to about 5%, about 2% to about 4%, about 2% to about 3%, about 3% to about 7%, about 3% to about 6%, about 3% to about 5%, about 3% to about 4%, about 4% to about 7%, about 4% to about 6%, about 4% to about 5%, about 5% to about 7%, about 5% to about 6%, about 6% to about 7%, or about 0.5%, about 0.6%, about 0.7%, about 0.8%, about 0.9%, about 1%, about 1.5%, about 2%, about 2.5%, about 3%, about 3.5%, about 4%, about 4.5%, about 5%, about 5.5%, about 6%, about 6.5%, or about 7% fluid loss additive bowc. In some embodiments, the cement slurry contains about 0.7% fluid loss additive bowc.

In some embodiments, the cement slurry contains silica flour. In some embodiments, the cement slurry contains about 0.5% bowc (based on weight of cement) to about 7% bowc silica flour, such as about 0% bowc (based on weight of cement) to about 40% bowc silica flour, such as about 5% to about 40%, about 5% to about 35%, about 5% to about 25%, about 5% to about 15%, about 15% to about 40%, about 15% to about 35%, about 15% to about 25%, about 25% to about 40%, about 25% to about 35%, about 35% to about 40%, or about 0%, about 5%, about 10%, about 15%, about 20%, about 25%, about 30%, about 35%, or about 40% silica flour bowc. In some embodiments, the cement slurry contains about 25% silica flour bowc.

In some embodiments, the cement slurry contains a defoamer. In some embodiments, the cement slurry contains about 0.01% bowc (based on weight of cement) to about 3% bowc defoamer, such as about 0.01% to about 3%, about 0.01% to about 2%, about 0.01% to about 1%, about 0.01% to about 0.5%, about 0.01% to about 0.1%, about 0.1% to about 3%, about 0.1% to about 2%, about 0.1% to about 1%, about 0.1% to about 0.5%, about 0.5% to about 3%, about 0.5% to about 2%, about 0.5% to about 1%, about 1% to about 3%, about 1% to about 2%, about 2% to about 3%, or about 0.01%, about 0.05%, about 0.1%, about 0.5%, about 1%, about 1.5%, about 2%, about 2.5%, or about 3% defoamer bowc.

In some embodiments, the method involves curing the treated metal casing with the cement slurry. In some embodiments, the treated metal casing and cement slurry are cured at about 25° C. to about 150° C., such as about 25° C. to about 125° C., about 25° C. to about 100° C., about 25° C. to about 85° C., about 25° C. to about 80° C., about 25° C. to about 50° C., about 50° C. to about 150° C., about 50° C. to about 125° C., about 50° C. to about 100° C., about 50° C. to about 85° C., about 50° C. to about 80° C., about 80° C. to about 150° C., about 80° C. to about 125° C., about 80° C. to about 100° C., about 80° C. to about 85° C., about 85° C. to about 150° C., about 85° C. to about 125° C., about 85° C. to about 100° C., about 100° C. to about 150° C., about 100° C. to about 125° C., about 125° C. to about 150° C., or about 25° C., about 50° C., about 80° C., about 82° C., about 85° C., about 100° C., about 125° C., or about 150° C. In some embodiments, the treated metal casing and cement slurry are cured at about 25° C. to about 150° C. In some embodiments, the treated metal casing and cement slurry are cured at about 80° C. to about 85° C. In some embodiments, the treated metal casing and cement slurry are cured at about 82° C.

In some embodiments, the treated metal casing and cement slurry are cured at about 0 MPa to about 100 MPa, such as about 10 MPa to about 75 MPa, about 10 MPa to about 50 MPa, about 10 MPa to about 25 MPa, about 10 MPa to about 20 MPa, about 20 MPa to about 100 MPa, about 20 MPa to about 75 MPa, about 20 MPa to about 50 MPa, about 20 MPa to about 25 MPa, about 25 MPa to about 100 MPa, about 25 MPa to about 75 MPa, about 25 MPa to about 50 MPa, about 50 MPa to about 100 MPa, about 50 MPa to about 75 MPa, about 75 MPa to about 100 MPa, or about 0 MPa, about 10 MPa, about 15 MPa, about 20 MPa, about 25 MPa, about 30 MPa, about 35 MPa, about 40 MPa, about 45 MPa, about 50 MPa, about 60 MPa, about 65 MPa, about 70 MPa, about 75 MPa, about 80 MPa, about 85 MPa, about 90 MPa, about 95 MPa, or about 100 MPa. In some embodiments, the treated metal casing and cement slurry are cured at about 0 MPa to about 100 MPa. In some embodiments, the treated metal casing and cement slurry are cured at about 20 MPa to about 25 MPa. In some embodiments, the treated metal casing and cement slurry are cured at about 20 MPa.

The treated metal casings described in the present disclosure can be used in wellbores used in the oil and gas industry. In some embodiments, when the treated casing is cured with cement, there is an increase in the shear bond strength at the cement-casing interface as compared to the same cement-casing interface of a neat or untreated casing. In some embodiments, when the treated casing is cured with cement, there is an increase in the compressive bond strength at the cement-casing interface as compared to the same cement-casing interface of a neat or untreated casing. Thus, provided in the present disclosure are methods for increasing the shear bond strength at the cement-casing interface using the treated casing materials of the present disclosure, as compared to the same cement-casing interface using neat or untreated casing materials. Also provided in the present disclosure are methods for increasing the compressive bond strength at the cement-casing interface using the treated casing materials of the present disclosure, as compared to the same cement-casing interface using neat or untreated casing materials.

In some embodiments, provided is a method of increasing the compressive bond strength between cement and a metal casing, where the metal casing is treated with cyanuric chloride as described in the present disclosure, where the compressive bond strength is increased as compared to the compressive bond strength between cement and a metal casing that has not been treated with cyanuric chloride. In some embodiments, the cured casing and cement exhibit a compressive bond strength of about 12 MPa to about 80 MPa, such as about 20 MPa to about 80 MPa, about 20 MPa to about 70 MPa, about 20 MPa to about 60 MPa, about 20 MPa to about 50 MPa, about 20 MPa to about 40 MPa, about 20 MPa to about 30 MPa, about 20 MPa to about 25 MPa, about 25 MPa to about 80 MPa, about 25 MPa to about 70 MPa, about 25 MPa to about 60 MPa, about 25 MPa to about 50 MPa, about 25 MPa to about 40 MPa, about 25 MPa to about 30 MPa, about 30 MPa to about 80 MPa, about 30 MPa to about 70 MPa, about 30 MPa to about 60 MPa, about 30 MPa to about 50 MPa, about 30 MPa to about 40 MPa, about 40 MPa to about 80 MPa, about 40 MPa to about 70 MPa, about 40 MPa to about 60 MPa, about 40 MPa to about 50 MPa, about 50 MPa to about 80 MPa, about 50 MPa to about 70 MPa, about 50 MPa to about 60 MPa, about 60 MPa to about 80 MPa, about 60 MPa to about 70 MPa, about 70 MPa to about 80 MPa, or about 12 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, about 70 MPa, about 75 MPa, or about 80 MPa, at a temperature of about 25° C. to about 205° C. and a confining pressure of about 0 MPa to about 100 MPa. In some embodiments, the cured casing and cement exhibit a compressive bond strength of about 12 MPa to about 80 MPa at a temperature of about 25° C. to about 205° C. and a confining pressure of about 0 MPa to about 100 MPa. In some embodiments, the cured casing and cement exhibit a compressive bond strength of about 20 MPa to about 60 MPa at a temperature of about 25° C. to about 205° C. and a confining pressure of about 0 MPa to about 100 MPa. In some embodiments, the cured casing and cement exhibit a compressive bond strength of about 25 MPa to about 30 MPa at a temperature of about 25° C. to about 205° C. and a confining pressure of about 0 MPa to about 100 MPa.

In some embodiments, provided is a method of increasing the shear bond strength between cement and a metal casing, where the metal casing is treated with cyanuric chloride as described in the present disclosure, where the shear bond strength is increased as compared to the shear bond strength between cement and a metal casing that has not been treated with cyanuric chloride. In some embodiments, the cured casing and cement exhibit a shear bond strength of about 5 MPa to about 50 MPa, such as about 10 MPa to about 50 MPa, about 10 MPa to about 40 MPa, about 10 MPa to about 30 MPa, about 10 MPa to about 25 MPa, about 10 MPa to about 20 MPa, about 10 MPa to about 15 MPa, about 15 MPa to about 50 MPa, about 15 MPa to about 40 MPa, about 15 MPa to about 30 MPa, about 15 MPa to about 25 MPa, about 15 MPa to about 20 MPa, about 20 MPa to about 50 MPa, about 20 MPa to about 40 MPa, about 20 MPa to about 30 MPa, about 20 MPa to about 25 MPa, about 25 MPa to about 50 MPa, about 25 MPa to about 40 MPa, about 25 MPa to about 30 MPa, about 30 MPa to about 50 MPa, about 30 MPa to about 40 MPa, about 40 MPa to about 50 MPa, or about 5 MPa, about 10 MPa, about 15 MPa, about 20 MPa, about 25 MPa, about 30 MPa, about 35 MPa, about 40 MPa, about 45 MPa, or about 50 MPa, at a temperature of about 25° C. to about 205° C. and a confining pressure of about 0 MPa to about 100 MPa. In some embodiments, the cured casing and cement exhibit a shear bond strength of about 5 MPa to about 50 MPa at a temperature of about 25° C. to about 205° C. and a confining pressure of about 0 MPa to about 100 MPa. In some embodiments, the cured casing and cement exhibit a shear bond strength of about 10 MPa to about 25 MPa at a temperature of about 25° C. to about 205° C. and a confining pressure of about 0 MPa to about 100 MPa. In some embodiments, the cured casing and cement exhibit a shear bond strength of about 15 MPa to about 20 MPa at a temperature of about 25° C. to about 205° C. and a confining pressure of about 0 MPa to about 100 MPa.

Also provided in the present disclosure is a method for providing zonal isolation in a wellbore in a subterranean formation. In some embodiments, the method includes inserting a metal casing into the wellbore, where the casing has a size such that a wellbore annulus is formed between an outside surface of the casing and a wall of the wellbore, providing a cement slurry to the wellbore annulus, and allowing the slurry to set, thereby curing and forming a bond between the casing and the cement. In some embodiments, the casing has been treated with cyanuric chloride. In some embodiments, the casing has been treated and conditioned according to the methods described in the present disclosure. In some embodiments, the methods provide long-term zonal isolation. In some embodiments, the methods using the casing treated with cyanuric chloride as provided in the present disclosure provide for longer zonal isolation as compared to the same casing that has not been treated with cyanuric chloride.

Also provided in the present disclosure are methods for preventing or reducing fluid leakage in a wellbore, such as the leakage of oil or gas. In some embodiments, the method includes inserting a metal casing into the wellbore, where the casing has a size such that a wellbore annulus is formed between an outside surface of the casing and a wall of the wellbore, providing a cement slurry to the wellbore annulus, and allowing the slurry to set, thereby curing and forming a bond between the casing and the cement. In some embodiments, the casing has been treated with cyanuric chloride. In some embodiments, the casing has been treated and conditioned according to the methods described in the present disclosure. In some embodiments, the methods provide prevent or reduce fluid leakage in a wellbore. In some embodiments, the methods using the casing treated with cyanuric chloride as provided in the present disclosure provide for reduced fluid leakage as compared to the same casing that has not been treated with cyanuric chloride.

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

"Mechanical properties" of cement refer to the properties that contribute to the overall behavior of the cement when subjected to an applied force, such as the frequent stresses cement is exposed to that impact its ability to both protect the casing and maintain zonal isolation. In some embodiments, reference to the mechanical properties of present disclosure refers to shear strength and/or compressive strength.

"Compressive strength," as used herein, means the maximum stress in compression mode that a sample can withstand at failure, where "failure" is defined as when the cement sample slips on the casing surface. Cement composition compressive strengths can vary from 0 psi to over 10,000 psi (0 to over 69 MPa). Compressive strength is generally measured at a specified time after the composition has been mixed and at a specified temperature and pressure. In some embodiments, compressive strength is measured by a non-destructive method that continually measures correlated compressive strength of a cement composition sample throughout the test period by utilizing a non-destructive sonic device. For example, compressive strength of a cement composition can be measured using the non-destructive method according to ANSI/API Recommended Practice 10-B2 at a specified time, temperature, and pressure.

EXAMPLES

Figure 1:
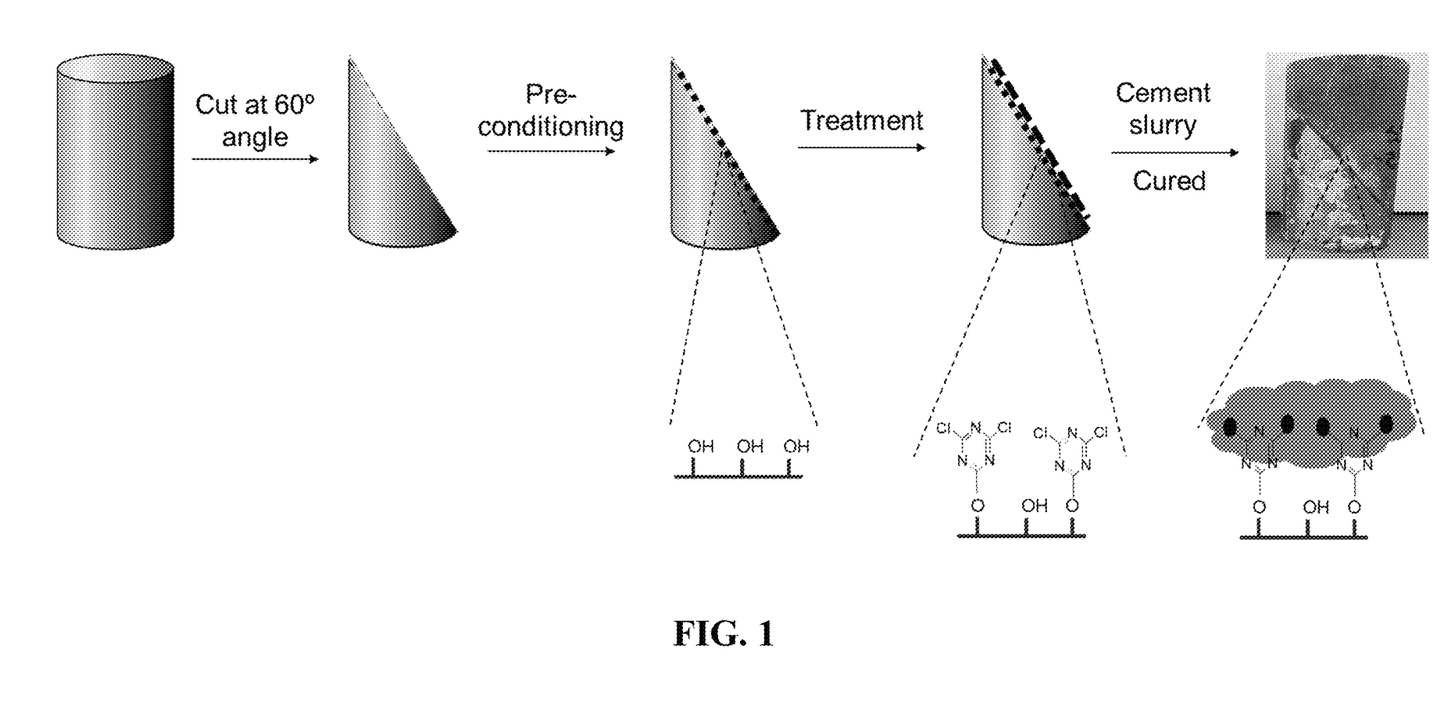
FIG. 1 illustrates the formation of chemical bonding between metal casing materials and cement.
Figure 2A:
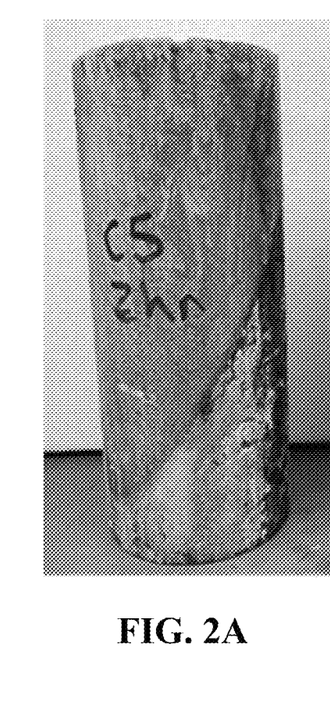
FIG. 2A depicts a sample containing carbon steel that was surface treated for 2 hours with a cyanuric chloride solution.
Figure 2B:
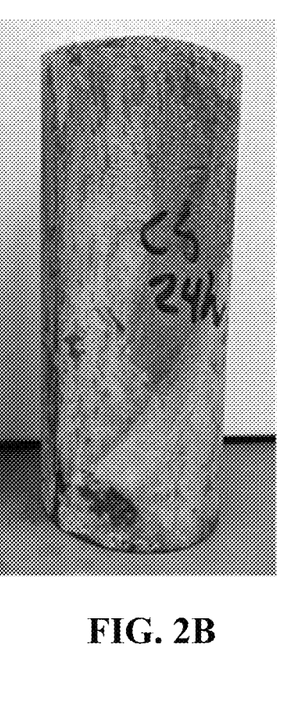
FIG. 2B depicts a sample containing carbon steel that was surface treated for 24 hours with a cyanuric chloride solution.
Figure 2C:
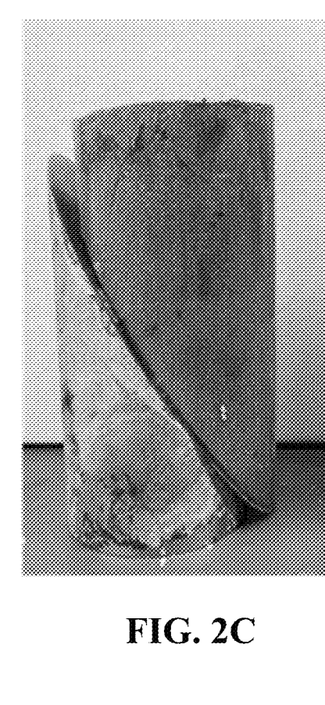
FIG. 2C depicts a sample containing stainless steel that was surface treated for 2 hours with a cyanuric chloride solution.
Figure 2D:
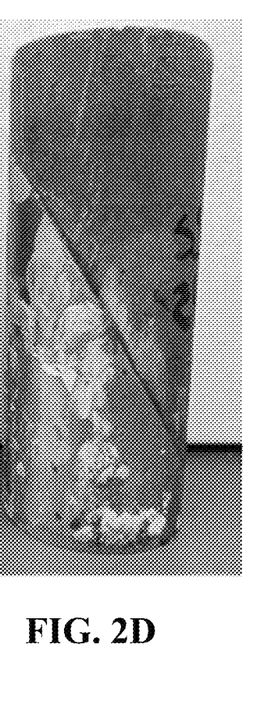
FIG. 2D depicts a sample containing stainless steel that was surface treated for 24 hours with a cyanuric chloride solution.

The general process of preparing the metal casing and the treating, functionalization, and formation of strong bonds between the casing materials and cement sheath is depicted in FIG. 1. The cylindrical metal casing was cut at a 60° angle to the horizontal plane. The metal casing then underwent a conditioning process in order to form hydroxyl (—OH) groups on the surface of the metal. The conditioned metal casing was then allowed to react with cyanuric chloride to form covalent linkages by reacting the hydroxyl groups on the surface of the metal with one of the chloride groups of the cyanuric chloride. The surface-treated metal casing was then used to form a casing-cement core for analysis for mechanical properties, such as shear bond strength and compressive bond strength as described in Example 3.

Example 1—Surface Treatment of Carbon Steel (CS) and Stainless Steel (SS)

To study the effect of cyanuric chloride treatment on the shear bond strength between metal casing materials and cement, a cylindrical metal casing that was cut at a 60° angle to the horizontal plane was used. Two solutions were prepared: (1) conditioning fluid that was a 1M NaOH solution; and (2) surface treatment fluid that was 1% w/v cyanuric chloride in tetrahydrofuran (5 g of cyanuric chloride was dissolved in 500 mL tetrahydrofuran).

To obtain the surface treated CS and SS samples, the samples were soaked in the conditioning fluid solution at 4° C. for 2 hours. The samples were then removed, drained, and placed in the surface treatment fluid solution at 4° C. for two different time intervals, either 2 hours or 24 hours, to coat the samples. After the respective time period, the coated CS and SS samples were removed from the treatment fluid and dried at room temperature for 12 hours. The treated samples were designated as CS-T-2 h, CS-T-24 h, SS-T-2 h, and SS-T-24 h, corresponding to the carbon steel samples that were treated for 2 hours and 24 hours and stainless steel samples that were treated for 2 hours and 24 hours, respectively.

Example 2—Preparation of Cured Cement with Treated and Untreated Metal Casings To prepare the metal casing-cement samples, a cement slurry as described in Table 1 was prepared. This slurry formulation was utilized to compare the effects that treatment has on shear bond strength. The cement formulation was prepared with Class G cement, water, silica flour (silicon oxide, 200 mesh size, 74 microns), retarder (chemically-modified lignosulfonates (FR-1, Fritz Industries, Mesquite, TX)), dispersant (sulfonated polymer (SC-9, Fritz Industries)), and fluid loss additive (polymer-based additive, FL-24, Fritz Industries). The API standard procedure of mixing cement slurry were adopted. A defoamer was used in the range of 0.2-1 mL to minimize the foaming during cement mixing. This cement slurry had a density of 15.5±0.25 lb/gal upon curing.

TABLE 1

| Cement slurry formulation (slurry 1) | |
|---|---|
| Component | Amount (g) |
| Saudi Class G | 596.8 |
| Silica Flour | 208.9 |
| Retarder | 1.4 |
| Dispersant | 2.4 |
| Fluid loss additive | 4.2 |
| Water | 325.3 |

The cement slurry was poured into six separate molds that were 2" (diameter)×6" (length) and that contained one of the metal casings prepared in Example 1 (CS-T-2 h, CS-T-24 h, SS-T-2 h, and SS-T-24 h) and untreated carbon steel and untreated stainless steel as controls. Each of the metal casings were cut at a 60° angle. The molds were then cured at 180° F., 3000 psi for 3 days. Table 2 shows the sample information of the cured cement with the treated and untreated samples. The cured metal casing-cement samples were removed after 4 days and machined to measure mechanical properties.

TABLE 2

| Curing of cement slurries with treated and untreated samples | | |
|---|---|---|
| Metal casing sample | Cement slurry | Cured sample |
| Untreated CS (control) | Slurry 1 | A1 |
| Untreated SS (control) | Slurry 1 | A2 |
| CS-T-2 h | Slurry 1 | A3 |
| CS-T-24 h | Slurry 1 | A4 |
| SS-T-2 h | Slurry 1 | A5 |
| SS-T-24 h | Slurry 1 | A6 |

The cured cement detached from the metal casings at different stages in sample preparation or measurement, indicative of binding characteristics. FIGS. 2A-2D show the cured samples removed from the molds after curing for 3 days at 180° F. and 3000 psi. Samples A2 and A5 (FIG. 2C) (untreated SS and SS treated for 2 hours, respectively) had detached cement when they were removed from the molds. Although sample A6 (FIG. 2D; SS treated for 24 hours) remained intact and was removed successfully from the mold, the cured cement section became detached from the surface while preparing for mechanical properties analysis. The cured cement did not detach from the surface of treated or untreated CS during sample preparation for mechanical tests as described in Example 3.

Example 3—Mechanical Properties Analysis

Each of the samples prepared according to Example 2 were tested for compressive bond strength and shear bond strength. The stages of sample preparation for the mechanical tests were as follows.
1. Cement curing
2. Sample removal from molds
3. Sample preparation by wrapping with a copper sleeve (to protect from hydraulic oil) and attaching strain gages The samples were then tested under confined pressure of 10 MPa at 77° F. using a tri-axial measurement instrument (AutoLab 3000, New England Research, Inc.). The tri-axial measurement instrument included a load cell with hydraulic intensifiers to support confining pressure and a piston for axial stress. The cylindrical samples (4.6 inch length×2 inch diameter) were placed in the load cell. A constant confining pressure of 10 MPa was applied and then the piston was loaded at a constant rate to apply axial stress until the cement slipped on the casing surface.

Mechanical properties (compressive bond strength and shear bond strength) were then calculated for each of the samples as shown in Table 3.

TABLE 3

Mechanical properties

| Cured Sample | Compressive bond strength (MPa) | Shear bond strength (MPa) |
|---|---|---|
| A1 | 11.28 | 4.89 |
| A2 | Failed at stage 2 of sample preparation | — |
| A3 | 27.74 | 12.01 |
| A4 | 34.82 | 15.08 |
| A5 | Failed at stage 2 of sample preparation | — |
| A6 | Failed at stage 3 of sample preparation | — |

As can be seen from Table 3, none of the treated or untreated SS samples were successfully tested. However, the CS samples that were surface treated with the cyanuric chloride solution prior to curing with the cement slurry (samples A3 and A4) exhibited increased compressive bond strength and increased shear bond strength as compared to a CS sample that had not been surface treated with the cyanuric chloride solution.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for treating the surface of a metal casing, the method comprising:
    conditioning the metal casing in a conditioning fluid comprising an aqueous alkali metal hydroxide solution, wherein the conditioning results in the formation of hydroxyl groups on the surface of the metal casing, resulting in a conditioned metal casing;
    contacting the conditioned metal casing with a treatment fluid comprising cyanuric chloride, resulting in a treated metal casing; and
    drying the treated metal casing, wherein the surface of the treated metal casing comprises cyanuric chloride covalently bound to the surface hydroxyl groups of the metal casing.

2. The method of claim 1, wherein the conditioning fluid comprises de-ionized water, tap water, or sea water.

3. The method of claim 1, wherein the concentration of the alkali metal hydroxide in the conditioning fluid is about 0.1 M to about 5 M.

4. The method of claim 1, wherein the alkali metal hydroxide is selected from the group consisting of lithium hydroxide (LiOH), sodium hydroxide (NaOH), potassium hydroxide (KOH), rubidium hydroxide (RbOH), and cesium hydroxide (CsOH).

5. The method of claim 1, wherein the conditioning comprises soaking the metal casing in the conditioning fluid or continuously flowing the conditioning fluid through or out of the casing.

6. The method of claim 1, wherein the conditioning comprises contacting the metal casing with the conditioning fluid for about 1 hour to about 12 hours.

7. The method of claim 1, wherein the conditioning occurs at about 4° C. to about 25° C.

8. The method of claim 1, wherein the treatment fluid comprises an organic solvent selected from the group consisting of tetrahydrofuran (THF), dioxane, and mixtures thereof.

9. The method of claim 1, wherein the treatment fluid comprises about 0.5% w/v to about 5% w/v cyanuric chloride.

10. The method of claim 1, wherein the contacting of the conditioned metal casing with the treatment fluid occurs at about 2° C. to about 10° C.

11. The method of claim 1, wherein the contacting the metal casing with the treatment fluid occurs for about 1 hour to about 48 hours.

12. The method of claim 1, wherein the conditioning and contacting occurs for a total time of about 1 hour to about 48 hours.

13. The method of claim 1, wherein the drying occurs at about 20° C. to about 30° C.

14. The method of claim 1, further comprising curing the treated metal casing with a cement slurry.

15. The method of claim 14, wherein the cement is a Portland cement selected from the group consisting of Class A cement, Class B cement, Class C cement, Class G cement, Class H cement, and mixtures thereof.

16. The method of claim 14, wherein the cement slurry comprises cement to water in a ratio of about 2:1.

17. The method of claim 14, wherein the cement slurry further comprises a retarder, a dispersant, a fluid loss additive, silica flour, defoamer, and combinations thereof.

18. The method of claim 14, wherein the treated metal casing and cement slurry are cured at about 80° C. to about 100° C.

19. The method of claim 14, wherein the treated metal casing and cement slurry are cured at about 10 MPa to about 25 MPa.

* * * * *